(12) United States Patent
Delaney et al.

(10) Patent No.: US 7,043,002 B2
(45) Date of Patent: May 9, 2006

(54) METHODS AND SYSTEMS FOR IDENTIFYING, REDIRECTING, AND PROCESSING MESSAGES OF DIFFERENT SS7 PROTOCOL VARIATIONS

(75) Inventors: Robert J. Delaney, Raleigh, NC (US); Todd Eichler, Wake Forest, NC (US); Peter J. Marsico, Chapel Hill, NC (US); Jonathan J. Palmer, Durham, NC (US)

(73) Assignee: Tekelec, Calabasas, CA (US)

( * ) Notice: Subject to any disclaimer, the term of this patent is extended or adjusted under 35 U.S.C. 154(b) by 56 days.

(21) Appl. No.: 10/607,740

(22) Filed: Jun. 27, 2003

(65) Prior Publication Data

US 2004/0264674 A1    Dec. 30, 2004

(51) Int. Cl.
*H04M 7/00* (2006.01)
(52) U.S. Cl. .......... 379/229; 379/230; 379/88.17; 379/221.08; 379/221.12
(58) Field of Classification Search .......... 370/466, 370/467; 379/88.17, 221.08, 221.12, 229, 379/230
See application file for complete search history.

(56) References Cited

U.S. PATENT DOCUMENTS

| | | | |
|---|---|---|---|
| 5,420,916 A | 5/1995 | Sekiguchi | 379/230 |
| 5,475,732 A * | 12/1995 | Pester, III | 379/32.01 |
| 5,852,660 A | 12/1998 | Lindquist et al. | 379/230 |
| 5,867,788 A | 2/1999 | Joensuu | 455/445 |
| 5,889,849 A | 3/1999 | Ban et al. | 379/230 |
| 6,094,578 A | 7/2000 | Purcell et al. | 455/426.1 |
| 6,324,279 B1 * | 11/2001 | Kalmanek et al. | 379/229 |
| 6,363,431 B1 | 3/2002 | Hammer et al. | 709/249 |
| 6,434,127 B1 | 8/2002 | Ha | 370/328 |
| 6,529,524 B1 | 3/2003 | Liao et al. | 370/467 |
| 6,683,881 B1 * | 1/2004 | Mijares et al. | 370/401 |
| 2003/0016684 A1 | 1/2003 | Prasad et al. | 370/410 |

* cited by examiner

*Primary Examiner*—Ahmad F. Matar
*Assistant Examiner*—Quynh H. Nguyen
(74) *Attorney, Agent, or Firm*—Jenkins, Wilson, Taylor & Hunt, P.A.

(57) ABSTRACT

Methods and systems for identifying and redirecting messages of different SS7 protocol variations are disclosed. A screening function receives SS7 message and identifies candidates for redirection. An SS7 variation identifier/redirection function identifies the SS7 protocol variation of incoming SS7 messages identified as candidates for redirection. The redirection candidates are encapsulated in SCCP messages. The SCCP messages are then forwarded to an application. The SCCP messages preferably include indicators identifying the protocol variations of their payloads. Upon receiving the SCCP messages, the application decodes the payloads using the protocol variation indicator.

31 Claims, 6 Drawing Sheets

METHODS AND SYSTEMS FOR IDENTIFYING, REDIRECTING, AND PROCESSING MESSAGES OF DIFFERENT SS7 PROTOCOL VARIATIONS

TECHNICAL FIELD

The present invention relates to methods and systems for identifying, redirecting, and processing messages of different SS7 protocol variations. More particularly, the present invention relates to methods and systems for identifying SS7 messages to be redirected to a service control point of one SS7 protocol variation and for inserting an indicator in the message to identify the protocol variation of the SS7 message that allows the service control point to process the message.

BACKGROUND ART

SS7 is a signaling protocol used internationally to establish and tear down calls and to query databases for information relating to calls and subscribers. However, different countries use different variations of the SS7 protocol. For example, in the United States, ANSI SS7 is the dominant signaling protocol. In Europe, individual countries use ITU-N SS7 for signaling in networks within the countries. For signaling between countries, the ITU-I SS7 protocol is used. Each of these SS7 protocol variations include different message formats. Within national networks, signaling nodes, such as signal transfer points and service control points, are typically configured to recognize only one SS7 protocol variation. Gateway nodes are placed between networks to convert from one SS7 protocol variation to another protocol variation. However, these gateway nodes are simply protocol converters. These protocol converters do not have the capability to intelligently redirect or process messages based on SS7 protocol variation.

In some instances, it may be desirable to redirect messages to a service control point of a particular SS7 protocol variation. For example, as illustrated in FIG. 1, an ANSI STP 100 is connected to an ANSI SCP 102 and an ANSI SS7 network 104. In one processing scenario, it may be desirable to allow calls from ANSI SS7 network 104 to be completed only during certain times of day. The times of day that calls are allowed may be stored in ANSI SCP 102. Accordingly, when ANSI SS7 network 104 sends an ANSI ISUP message to a destination end office, ANSI STP 100 may redirect the ISUP message to ANSI SCP 102 to determine whether the call should be allowed. This redirection may be accomplished by encapsulating the ANSI ISUP message in an SCCP unit data message, which is in turn encapsulated in an MTP message. ANSI SCP 102 receives the encapsulated message, determines whether the call should be completed, and if the call is allowed, forwards the ISUP message to its intended destination.

Conventional STP redirect functions are capable of redirecting messages formatted according to a single SS7 protocol variation. Thus, when ANSI STP 100 illustrated in FIG. 1 receives an ITU-N message or ITU-I ISUP message, the message would be discarded. Discarding messages relating to a call is undesirable, since the calls would not be completed. Accordingly, there exists a need for improved methods and systems for identifying, redirecting, and processing messages of different SS7 protocol variations.

DISCLOSURE OF THE INVENTION

The present invention includes methods and systems for identifying, redirecting, and processing messages of different SS7 protocol variations. In one example, a signaling message routing node receives an ISUP message of one SS7 protocol variation. The signaling message routing node determines whether the message should be redirected to a service control point. The signaling message routing node also identifies the SS7 protocol variation of the ISUP message. The signaling message routing node then encapsulates the ISUP message in an SCCP message. The SCCP message is then encapsulated in an MTP message. The SCCP and MTP messages may be formatted according to a predetermined SS7 protocol variation.

According to one important aspect of the invention, the signaling message routing node identifies the protocol variation of the original ISUP message and inserts an indicator of that protocol variation in the encapsulating SCCP message. This indicator allows the receiving node to properly decode and process the encapsulated message, even if the receiving node uses a different protocol variation than the protocol variation of the encapsulated message for external communications. For example, if the original ISUP message is an ITU-N ISUP message and the message is being sent to an SCP that uses ANSI SS7, the ITU-N ISUP message may be encapsulated in an ANSI SCCP packet and an ANSI MTP-3 packet. However, in the ANSI SCCP packet, the signaling message routing node may insert an indicator that indicates that the payload is ITU-N. The signaling message routing node may then forward the encapsulated ITU-N message to the ANSI SCP. The ANSI SCP may then decode the encapsulating SCCP message and identify the protocol variation of the payload. Since the ANSI SCP knows the protocol variation of the payload, the SCP may then decode the payload using the ITU-N protocol. The SCP may then determine whether the payload message should be forwarded to its destination.

In an alternate implementation of the invention, rather than redirecting only ISUP messages, the multi-protocol redirect function of the present invention may be used to redirect SCCP messages to SCPs for providing an appropriate database service. In performing multi-SS7-variation SCCP message redirection, received SCCP messages may be encapsulated in SCCP and MTP-3 headers of a predetermined protocol type. The SCCP message may indicate the protocol variation of the payload. The receiving node may decode and process the payload using the protocol variation indicator.

In yet another implementation of the invention, rather than having a single SCP capable of decoding payloads having multiple SS7 protocol variations, an STP may be connected to SCPs of different protocol variations and may redirect the message to the SCP of the appropriate protocol variations. In this scenario, the protocol indicator would not be required to be sent in the message because the message would be formatted according to the appropriate SS7 protocol variation and sent to the appropriate SCP.

Accordingly, it is an object of the invention to provide methods and systems for identifying, redirecting, and processing messages of different SS7 protocol variations.

It is another object of the invention to provide methods and systems for processing SS7 messages of different SS7 protocol variations based on indicator inserted in the SS7 messages.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
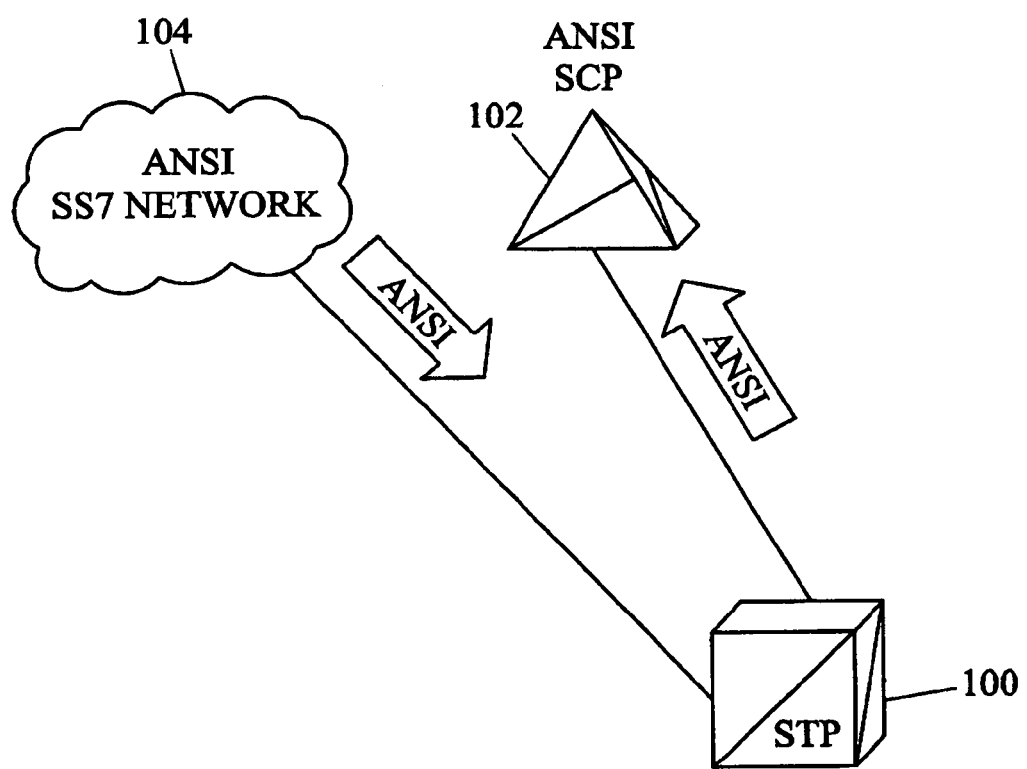
FIG. 1 is a block diagram illustrating message redirection in a conventional SS7 network that utilizes a single variation of the SS7 protocol.
Figure 2:
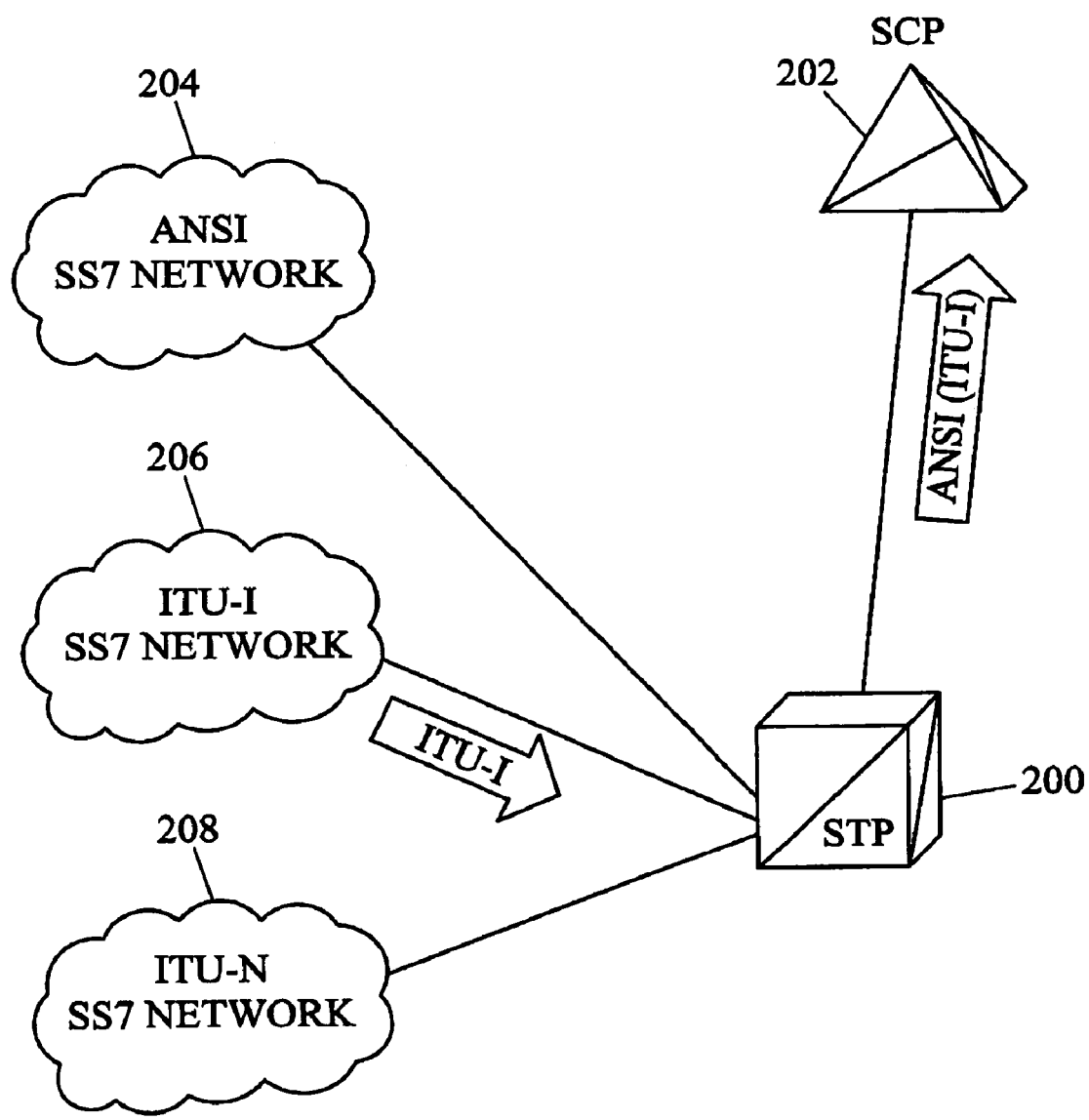
FIG. 2 is a block diagram illustrating message redirection using a signal transfer point capable of identifying and redirecting messages of different SS7 protocol variations and a service control point capable of processing SS7 messages of different SS7 protocol variations according to an embodiment of the present invention.

FIG. 2 illustrates a network including an STP 200 capable of identifying and redirecting SS7 messages of different SS7 protocol variations and an SCP 202 capable of processing SS7 messages redirected by STP 200. In the illustrated example, STP 200 is connected to ANSI SS7 network 204, an ITU-1 network 206, and an ITU-N network 208. STP 200 is preferably capable of receiving SS7 messages from all three types of networks, identifying the SS7 protocol variations of the messages, redirecting predetermined SS7 messages to SCP 202 and including an indicator in the redirected messages that indicates the SS7 protocol variation of each message. STP 200 and SCP 202 communicate using one SS7 protocol variation. In the illustrated example, the SS7 protocol variation used for communications between STP 200 and SCP 202 is assumed to be the ANSI SS7 protocol. However, SCP 202 is also capable of decoding encapsulated messages received from STP 200 of different SS7 protocol variations using the indicators provided by STP 200.

In the illustrated example, ITU-I SS7 network 206 is assumed to send an ITU-I ISUP message to STP 200. The ITU-I ISUP message may be addressed to the point code of an end office in ITU-N network 208. Because the operators of networks 206 and 208 may only allow calls to be completed between their networks during certain time periods, STP 200 may redirect the ITU-I message to SCP 202. Identifying whether the message should be redirected may be performed using gateway screening and a redirect table associated with gateway screening. The parameters used to identify whether the message should be redirected may include the OPC, the DPC, and the service indicator. Once STP 200 identifies the message as a candidate for redirection, STP 200 encapsulates the message in an ANSI SCCP packet and encapsulates the ANSI SCCP packet in an ANSI MTP-3 packet. It is understood that the SCCP and MTP-3 encapsulation may be performed in a single step. STP 200 preferably also inserts an indicator in the message that communicates to SCP 202 that the message payload is ITU-I ISUP. This indicator may be inserted in any unused field in the message. In one example, the SS7 protocol variation indicator may be inserted in the calling party subsystem number of the encapsulating SCCP message. For example, the subsystem number may be set to "0" for ANSI format or "1" for ITU format. The network indicator parameter in the ISUP message may be used to indicate whether an ITU ISUP message is of the ITU-N protocol or the ITU-I protocol.

Upon receiving the message, SCP 202 examines the protocol variation indicator and determines the SS7 protocol variation of the payload message. The indicator inserted by STP 200 enables SCP 202 to decode ISUP and other message types of different SS7 protocol variations while only being required to implement external message routing and SCCP connection control in one of the variations.

The present invention is not limited to using a protocol variation indicator in a message to indicate the SS7 protocol variation to an SCP. In an alternate implementation, rather than inserting an indicator in an unused field or fields of a redirected message, STP 200 may have different links or linksets connected to SCP 202, where each linkset corresponds to a particular protocol variation. STP 200 may be configured to redirect ITU-I ISUP messages over one linkset, ITU-N ISUP messages over another linkset, and ANSI ISUP messages to SCP 202 over yet another linkset. SCP 202 would then know how to process the messages based on the linkset from which the messages were received. In this example, STP 200 preferably still encapsulates the ISUP messages in ANSI SCCP and MTP packets.

Figure 3:
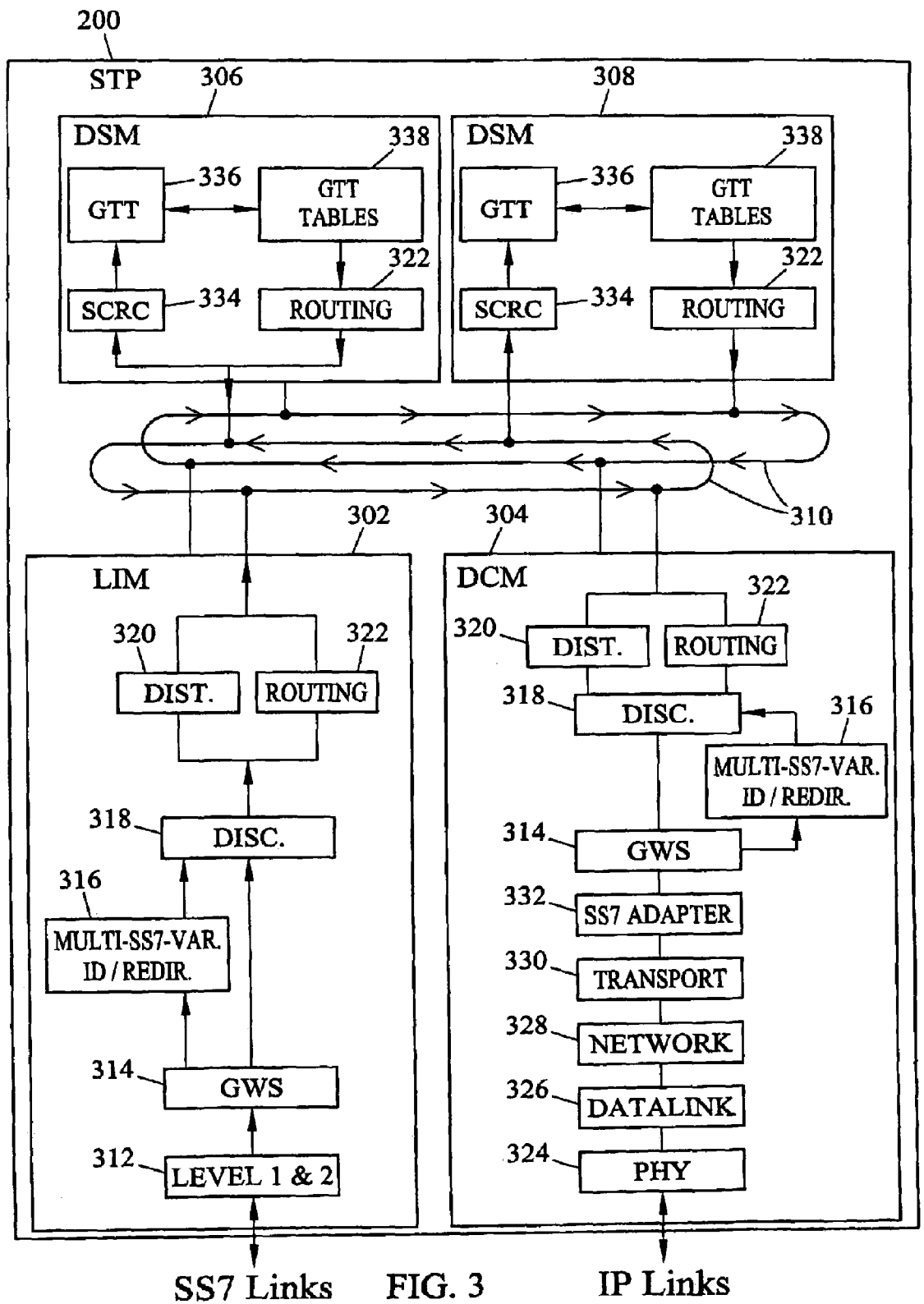
FIG. 3 is a block diagram illustrating an exemplary internal architecture of a signal transfer point capable of identifying and redirecting SS7 messages of different SS7 protocol variations according to an embodiment of the present invention.
Figure 4:
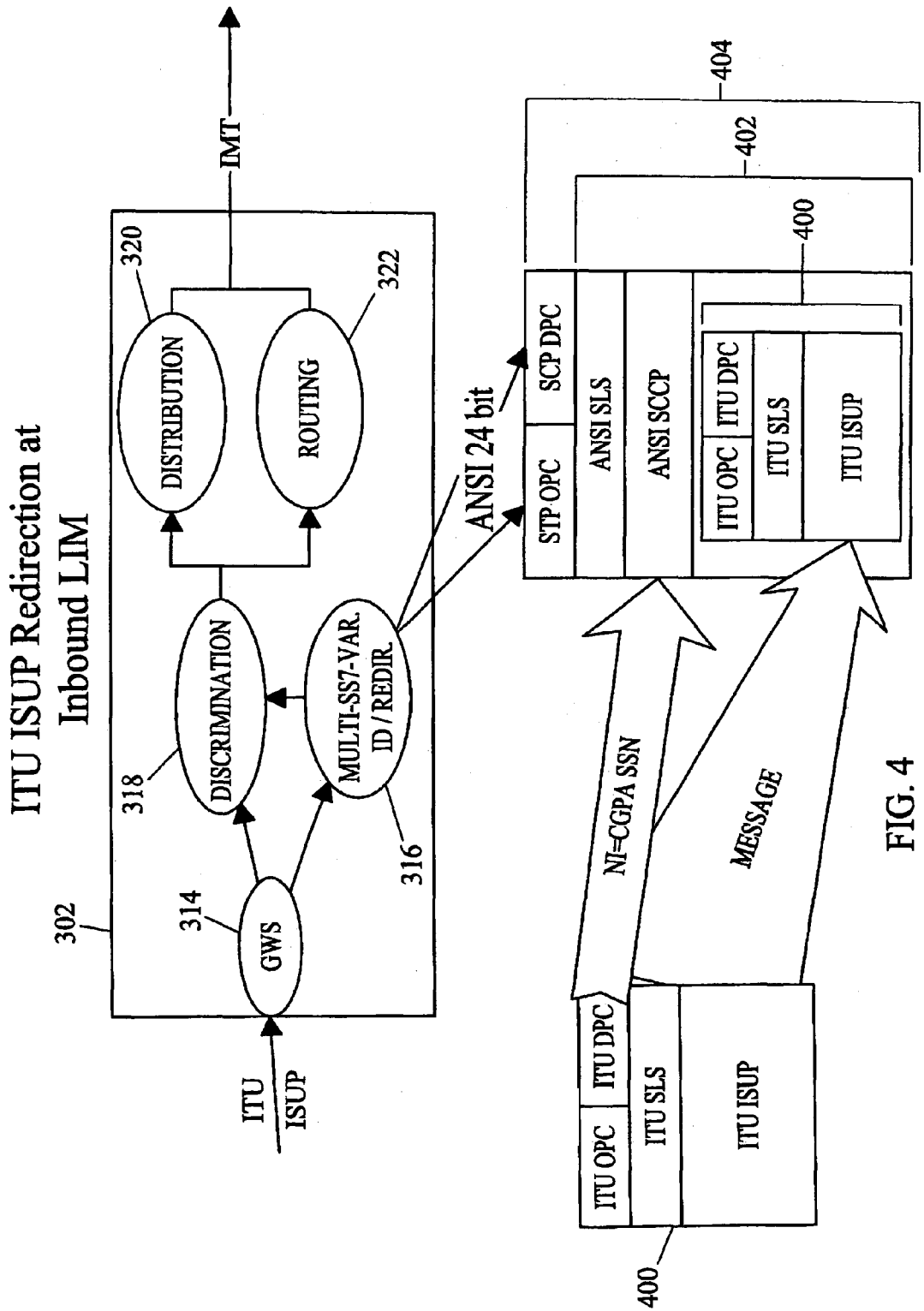
FIG. 4 is a block diagram illustrating exemplary processing at an inbound link interface module for SS7 messages of different SS7 protocol variations according to an embodiment of the present invention.

FIG. 3 illustrates an exemplary internal architecture for STP 200 for identifying and redirecting SS7 messages having multiple different SS7 protocol variations. Referring to FIG. 3, STP 200 includes a plurality of internal processing cards or modules connected by a pair of buses. In the illustrated example, these modules include a link interface module 302, a data communications module 304, and database services modules (DSMs) 306 and 308. The modules are connected by a pair of counter-rotating ring buses 310.

Link interface module 302 is configured to send and receive SS7 messages over SS7 signaling links. Accordingly, link interface module 302 includes SS7 level 1 and 2 function 312 for performing SS7 level 1 and 2 functions, such as error detection, error correction, and sequencing. Gateway screening function 314 screens messages based on one or more parameters in the messages to determine whether to allow the messages into the network. In addition, gateway screening function 314 identifies messages as redirection candidates. As discussed above, gateway screening function 314 may use the OPC, the DPC, and the service indicator to determine whether a message is a candidate for redirection. Multi-SS7-variation ID/redirection function 316 receives messages identified as redirection candidates, encapsulates the messages in an SCCP and MTP packets of an SS7 protocol variation, inserts a protocol variation indicator in the packets, and forwards the packets to discrimination function 318. Discrimination function 318 determines whether received messages should be passed to routing function 320 for routing to an appropriate outbound signaling link or to distribution function 318 to be distributed internally for further processing. This determination may be made based on the destination point code in the message. Routing function 322 routes messages identified as requiring external routing. Distribution function 320 distributes messages identified as requiring further internal processing by STP 200.

Data communications module 304 includes functions for sending and receiving SS7 messages over IP signaling links. In the illustrated example, these modules include a physical layer function 324 for performing OSI physical layer functions, such as modulating data signals onto a carrier for transmission over a physical medium. Datalink function 326 performs OSI datalink functions, such as ensuring reliable communications between directly connected nodes. Network function 328 performs network layer routing, such as IP routing. Transport function 330 performs transport layer functions, such as connection management, reliable end-to-end delivery of messages and flow control. SS7 adapter layer 332 includes functions for sending and receiving SS7 messages over an underlying IP network. SS7 adapter layer 332 may implement M2PA, M3UA, M2UA, SUA, or any other suitable SS7 adapter layer protocol. Functions 314–322 perform similar functions to the correspondingly numbered components described above with regard to LIM 302.

DSMs 306 and 308 may perform various database services, such as global title translation and number portability translation. In the illustrated example, each DSM includes a signaling connection routing controller 334 for controlling overall SCCP functions. One SCCP function that may be called or initiated by SCRC 334 is global title translation function 336. Global title translation function 336 performs intermediate and final global title translations on received messages indicated as route-on-global title. In order to perform these translations, global title translation function 336 accesses GTT tables 336. After global title translation, messages are passed to routing function 322 for final routing. Specific examples will be described below where SCCP messages are encapsulated in new SCCP packets and sent to DSMs 306 and 308 for global title translation of the encapsulating SCCP packet. The purpose of global title translating the encapsulating SCCP packet is to send different messages to different services or to perform load sharing. In addition, message redirection and screening may be performed after global title translation, as will be described in detail below.

Figure 5:
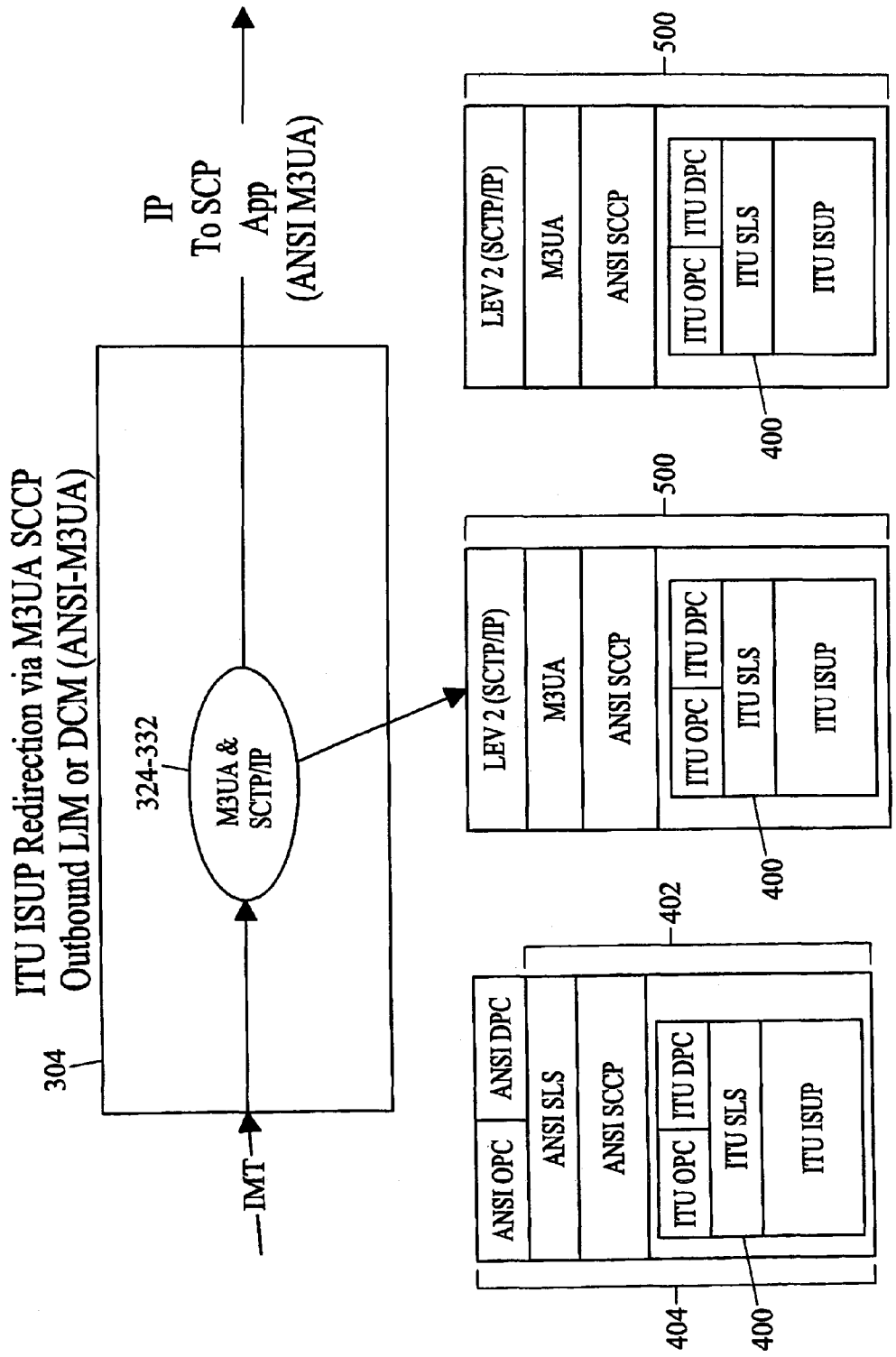
FIG. 5 is block diagram illustrating exemplary processing at an outbound link interface module for SS7 messages of different protocol variations according to an embodiment of the present invention.

FIG. 5 illustrates exemplary processing at inbound LIM 302 for an incoming ITU ISUP message that triggers message redirection. In the illustrated example, ISUP message 400 is received by LIM 302. The message is from an ITU OPC and addressed to an ITU DPC. Gateway screening function 314 identifies the message as requiring redirection service. Accordingly, gateway screening function 314 forwards the ITU ISUP message to multi-SS7-variation ID/redirection function 316.

Multi-SS7-variation ID/redirection function 316 encapsulates ITU ISUP message 400 in the payload portion of an ANSI SCCP message 402. ANSI SCCP message 402 is then encapsulated in an ANSI MTP message 404. Multi-SS7-variation ID/redirection function 316 inserts an SS7 protocol variation indicator identifying the SS7 protocol variation of the payload of the message in the calling party subsystem number field of the encapsulating SCCP message. In this case, the calling party subsystem number would identify the payload as an ITU ISUP message. Accordingly, SCP 202 would know how to decode and process the payload when it receives the message. After inserting the protocol variation indicator in the message, multi-SS7-variation identifier/redirection function 316 forwards the message to discrimination function 318. Since the encapsulating MTP-3 message is addressed to a DPC associated with SCP 302, discrimination function 318 forwards the message to routing function 322. Routing function 322 then routes the message to the card associated with the outbound signaling link.

FIG. 5 is a block diagram illustrating exemplary outbound message processing of the SCCP-encapsulated ISUP message. Referring to FIG. 5, encapsulated ISUP message 400 is received by outbound DCM 304. M3UA and SCTP/IP functions 324–332 encapsulate SCCP-encapsulated ISUP message 400 in an SCTP/IP/M3UA message 500. Once functions 324–332 complete the encapsulation, the message is forwarded to SCP 202 over the appropriate outbound signaling link. Because the message includes an indicator indicating the message type, SCP 202 knows how to decode the message. As a result, SCP 202 can implement ANSI as its external SS7 protocol variation while being able to decode ISUP messages of other SS7 protocol variations.

Figure 6:
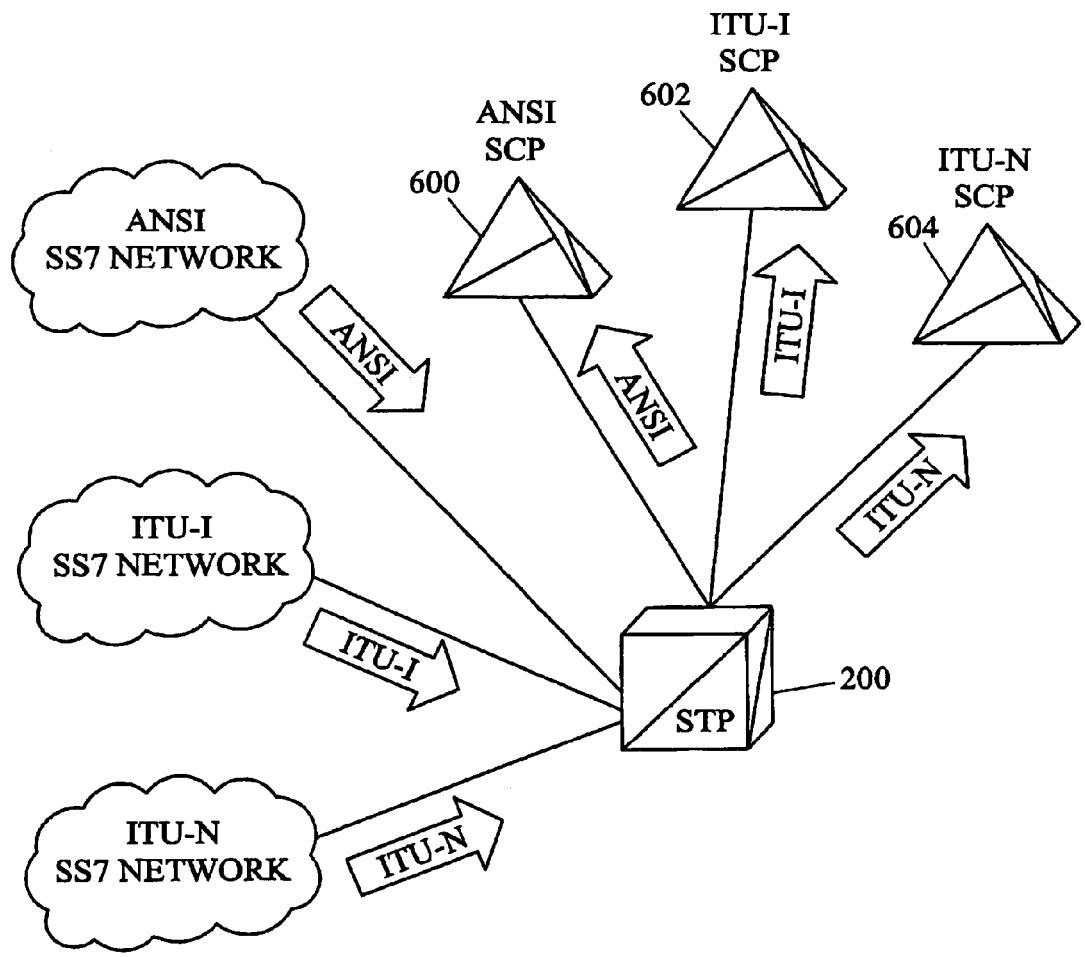
FIG. 6 illustrates an alternate embodiment of the invention in which an STP of the present invention is configured to identify SS7 messages of different protocol variations and to direct these messages to SCPs of the appropriate protocol variation and/or service type.

In an alternate embodiment of the invention, rather than redirecting ISUP messages to a single SCP capable of decoding multiple SS7 protocol variations, multi-SS7-variation identifier/redirection function 316 may be configured to encapsulate received messages in an SCCP packet of the appropriate protocol variation and forward the messages to SCPs of the appropriate protocol variation. FIG. 6 illustrates a network in which this capability may be useful. In FIG. 6, STP 200 is connected to ANSI SCP 600, and ITU-I ISUP STP 602, and ITU-N STP 604. In the examples illustrated in FIG. 6, it is assumed that each SCP has a separate point code of the corresponding protocol variation. Alternatively, or in addition, each SCP may have an IP address.

If an incoming ANSI ISUP message is indicated as a candidate for redirection, multi-SS7-variation identifier/redirection function 316 may encapsulate the ANSI ISUP message in an ANSI SCCP message and forward the message to ANSI SCP 600. If an ITU-I ISUP message is received, multi-SS7-variation ID/redirection function 316, may encapsulate the message in an ITU-I SCCP message and forward the message to ITU-I SCP 602. If an ITU-N message is received, multi-SS7-variation identifier/redirection function 316 may encapsulate the message in an ITU-N message and forward the message to ITU-N SCP 604. Thus, by identifying the SS7 protocol variation and redirecting messages to the appropriate SCP, the present invention ensures that messages will be decoded properly.

The present invention is not limited to identifying the protocol variation of received ISUP messages and redirecting these messages to the appropriate SCP. In an alternate embodiment of the invention, multi-SS7-variation ID/redirection function 316 may be configured to redirect SCCP messages as well as ISUP messages. In performing SCCP message redirection, multi-SS7-variation ID/redirection function 316 may encapsulate the messages in an SCCP and MTP headers addressed to STP 200. The translation type and the global title address in the SCCP header may be the same for all SCCP message if only one service type is provisioned for redirected messages. Alternatively, if multiple service types are provisioned, multi-SS7-variation ID/redirection function 316 may map the OPC and DPC in an incoming message to appropriate translation type so that the messages requiring different services will be global-title-translated differently and routed to a node capable of providing the requisite service. Once SCCP-encapsulated SCCP messages are received by a DSM module, the DSM module performs global title translation on the encapsulating SCCP header.

The result of the global title translation is a point code and subsystem number, which may correspond to one of the SCPs connected to STP 200. Accordingly, the multi-SS7-variation identification and redirection functionality of the present invention can apply to received SCCP messages, as well as ISUP messages.

In addition to performing multi-SS7-variation identification and redirection processing on the inbound link interface module, the present invention may also include performing such screening on the DSM module after global title translation. Performing multi-SS7-variation identification and verification after global title translation increases the likelihood that messages will be properly redirected based on the global-title-translated destination point code.

Although the embodiments described above relate to redirecting messages of different SS7 protocol variations to an SCP, the present invention is not limited to redirecting messages to an SCP. Redirecting messages to any suitable application, including applications resident on an SCP, is intended to be within the scope of the invention.

Thus, the present invention provides methods and systems for identifying, redirecting, and processing messages of multiple different SS7 protocol variations. Identifying the protocol variation of a received message and communicating the variation to an SCP allows an SCP that communicates externally using one SS7 protocol variation to process messages of multiple different SS7 protocol variations. Without the ability to identify the SS7 protocol variation of a received message, such an SCP would simply discard messages of protocol variations other than its native protocol variation. The present invention avoids this problem and thus increases the likelihood that calls will be competed.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for redirecting messages of different SS7 protocol variations, the method comprising:
   (a) receiving an SS7 message;
   (b) determining whether the received SS7 message requires redirection;
   (c) in response to determining that the message requires redirection, identifying the SS7 protocol variation of the message;
   (d) encapsulating the received SS7 message in a signaling message control part (SCCP) message of a predetermined SS7 protocol variation;
   (e) including an indicator in the SCCP message, the indicator identifying the SS7 protocol variation of the received SS7 message;
   (f) sending the SCCP message to an application; and
   (g) at the application, using the indicator to process the encapsulated SS7 message.

2. The method of claim 1 wherein the SS7 message comprises an ISUP message.

3. The method of claim 1 wherein the SS7 message comprises an SCCP message.

4. The method of claim 1 wherein identifying the SS7 protocol variation of the SS7 message comprises determining whether the SS7 message is an ANSI, ITU-I, or ITU-N message.

5. The method of claim 1 wherein including an indicator in the SCCP message comprises including the indicator in a calling party subsystem number field of the SCCP message.

6. The method of claim 1 wherein sending the SCCP message to a service control point includes sending the SCCP message to a service control point over an SS7 signaling link.

7. The method of claim 1 wherein sending the SCCP message to a service control point includes sending the SCCP message to a service control point over an IP signaling link.

8. The method of claim 1 wherein steps (a)–(f) are performed at a signal transfer point and wherein step (g) is performed at a service control point.

9. The method of claim 1 wherein steps (a)–(f) are performed at an SS7/IP gateway and wherein step (g) is performed at an IP-enabled service control point.

10. The method of claim 1 comprising performing global title translation on the received SS7 message and wherein determining whether the received SS7 message requires redirection includes determining whether the received SS7 message requires redirection after performing the global title translation.

11. The method of claim 1 comprising performing global title translation on the SCCP message to produce a destination point code and wherein sending the SCCP message to an application includes sending the SCCP message to an application corresponding to the destination point code.

12. A method for redirecting messages of different SS7 protocol variations, the method comprising:
   (a) receiving an SS7 message;
   (b) determining whether the received SS7 message requires redirection;
   (c) in response to determining that the message requires redirection, identifying the SS7 protocol variation of the message;
   (d) encapsulating the received SS7 message in an SCCP message having an SS7 protocol variation corresponding to the identified protocol variation; and
   (e) sending the SCCP message to an application of the identified protocol variation.

13. The method of claim 12 wherein the SS7 message comprises an ISUP message.

14. The method of claim 12 wherein the SS7 message comprises an SCCP message.

15. The method of claim 12 identifying the SS7 protocol variation of the message comprises determining whether the message is an ANSI, ITU-I, or ITU-N message.

16. The method of claim 12 wherein sending the message to a service control point of the identified protocol variation includes selecting an outbound linkset for the message based on the identified protocol variation.

17. The method of claim 12 comprising global title translating the SCCP message and determining a destination point code for the SCCP message and wherein sending the SCCP message to an application of the identified protocol variation includes selecting the application based on the destination point code.

18. The method of claim 12 wherein sending the SCCP message to an application includes sending the SCCP message to the application over an SS7 signaling link.

19. The method of claim 12 wherein sending the SCCP message to an application includes sending the SCCP message to the application over an IP signaling link.

20. The method of claim 12 wherein steps (a)–(f) are performed at a signal transfer point and wherein the application resides on a service control point.

21. The method of claim 12 wherein steps (a)–(f) are performed at an SS7/IP gateway and wherein the application resides on an IP-enabled service control point.

22. The method of claim 12 comprising performing global title translation on the received SS7 message and wherein determining whether the received SS7 message requires redirection includes determining whether the received SS7 message requires redirection after performing the global title translation.

23. A signaling message routing node for identifying and redirecting messages of different SS7 protocol variations, the signaling message routing node comprising:
(a) a link interface module for sending and receiving SS7 messages;
(b) a screening function operatively associated with the link interface module for identifying predetermined SS7 messages as redirection candidates;
(c) an SS7 protocol variation identification/redirection function operatively associated with the link interface module for receiving the SS7 messages identified by the screening function as redirection candidates, for identifying the SS7 protocol variation of each of the messages, for encapsulating the messages in SCCP messages, and for indicating the protocol variation of the encapsulated messages; and
(d) a routing function operatively associated with the link interface modules for routing the SCCP messages to applications for processing the encapsulated SS7 messages.

24. The signaling message routing node of claim 23 wherein the screening function is adapted to examine at least one of originating point codes, destination point codes, and service indicators in the SS7 messages to identify redirection candidates.

25. The signaling message routing node of claim 23 wherein the screening function comprises a gateway screening function for determining whether or not to allow SS7 messages into a network.

26. The signaling message routing node of claim 23 wherein the SS7 protocol variation identification/redirection function is adapted to determine whether the messages identified as redirection candidates are ITU-I, ITU-N, or ANSI SS7 messages.

27. The signaling message routing node of claim 23 wherein the SS7 protocol variation identification/redirection function is adapted to indicate the protocol variation by inserting a protocol variation indicator in a predetermined field of each SCCP message.

28. The signaling message routing node of claim 27 wherein the predetermined field comprises an SCCP calling party subsystem number field.

29. The signaling message routing node of claim 23 wherein the SS7 protocol variation identification/redirection function is adapted to indicate the protocol variation by providing separate outbound linksets for each of the SS7 protocol variations and to redirect the SCCP messages to the outbound linkset corresponding to the protocol variation of the encapsulated SS7 message.

30. The signaling message routing node of claim 23 wherein the messages identified as redirection candidates comprise ISUP messages.

31. The signaling message routing node of claim 23 wherein the messages identified as redirection candidates comprise SCCP messages.

* * * * *